US008836175B1

(12) United States Patent
Eichelberg

(10) Patent No.: US 8,836,175 B1
(45) Date of Patent: Sep. 16, 2014

(54) POWER DISTRIBUTION SYSTEM FOR RACK-MOUNTED EQUIPMENT

(75) Inventor: John W. Eichelberg, Spokane, WA (US)

(73) Assignee: Amazon Technologies, Inc., Reno, NV (US)

( * ) Notice: Subject to any disclaimer, the term of this patent is extended or adjusted under 35 U.S.C. 154(b) by 584 days.

(21) Appl. No.: 13/172,173

(22) Filed: Jun. 29, 2011

(51) Int. Cl.
*H01B 7/30* (2006.01)
(52) U.S. Cl.
USPC .......................................... 307/147; 307/156
(58) Field of Classification Search
USPC ................................................ 307/147, 156
See application file for complete search history.

(56) References Cited

U.S. PATENT DOCUMENTS

| 7,215,535 B2 * | 5/2007 | Pereira .......................... 361/624 |
| 2003/0121689 A1 * | 7/2003 | Rasmussen et al. ............ 174/50 |

OTHER PUBLICATIONS

"Cisco Switch Guide—Scalable, intelligent LAN switching for campus, branch and data center networks of all sizes" Version 7, Cisco, Summer 2011, pp. 1-134.
"Cisco Nexus 7000 Series Environment" 2008-2010 Cisco, pp. 1-9.
"Cisco Nexus 7000 Solutions—New 50/60A 3-phase CDU with Locking Outlets" downloaded Jun. 29, 2011 from http://www.servertech.com/solutions/data-center-power/cisco-nexus-7000/ , pp. 1-2.
"PIPS (Per Inlet Power Sensing)—Introducing the best infeed power measurement technology on the market for data center rack-level power monitoring" downloaded Jun. 29, 2011 from http://www.servertech.com/solutions/About_PIPS , pp. 1-3.

* cited by examiner

*Primary Examiner* — Robert L. DeBeradinis
(74) *Attorney, Agent, or Firm* — Robert C. Kowert; Meyertons, Hood, Kivlin, Kowert & Goetzel, P.C.

(57) ABSTRACT

A system includes a rack, one or more computing devices, and one or more rack power distribution units. The computing devices include one or more power supply units. The rack power distribution units include a set of power output receptacles. A set of power inputs on the power supply units matches the set of output receptacles on the rack power distribution units.

27 Claims, 8 Drawing Sheets

POWER DISTRIBUTION SYSTEM FOR RACK-MOUNTED EQUIPMENT

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 110V). A network of cabling, bus bars, power connectors, and power distribution units, is used to deliver the power at the lower voltage to numerous specific components in the facility.

From time to time, elements in the power chain providing power to electrical systems fail or shut down. For example, if a power distribution unit that provides power to electrical systems is overloaded, an overload protection device in the power distribution unit (for example, a fuse or breaker) may trip, shutting down all of the electrical systems that are receiving power through that line of the power distribution unit.

In many rack system installations, the rack power distribution units include a strip or bank of numerous output receptacles (for example, 12 or more receptacles). The large number of receptacles is often useful if the rack holds a large number of individual servers, fans, and other powered equipment. At the same time, however, excess receptacles waste valuable rack space. In addition, the large number of receptacles in a rack power distribution unit may also increase the possibility for an overload of a rack power distribution unit, as maintenance personnel plug device after device into the empty output receptacles.

The risk of overload of a rack power distribution unit may be greater in cases where a rack holds a single large piece of equipment with a few large power supplies (for example, a switch system with four 6.0 kilowatt power supplies). Although the power supplies for the piece of equipment use only a few of the available output receptacles (for example, one receptacle per power supply), the power supplies for the piece of equipment may use up nearly all of the capacity of the rack power distribution unit.

Figure 1:
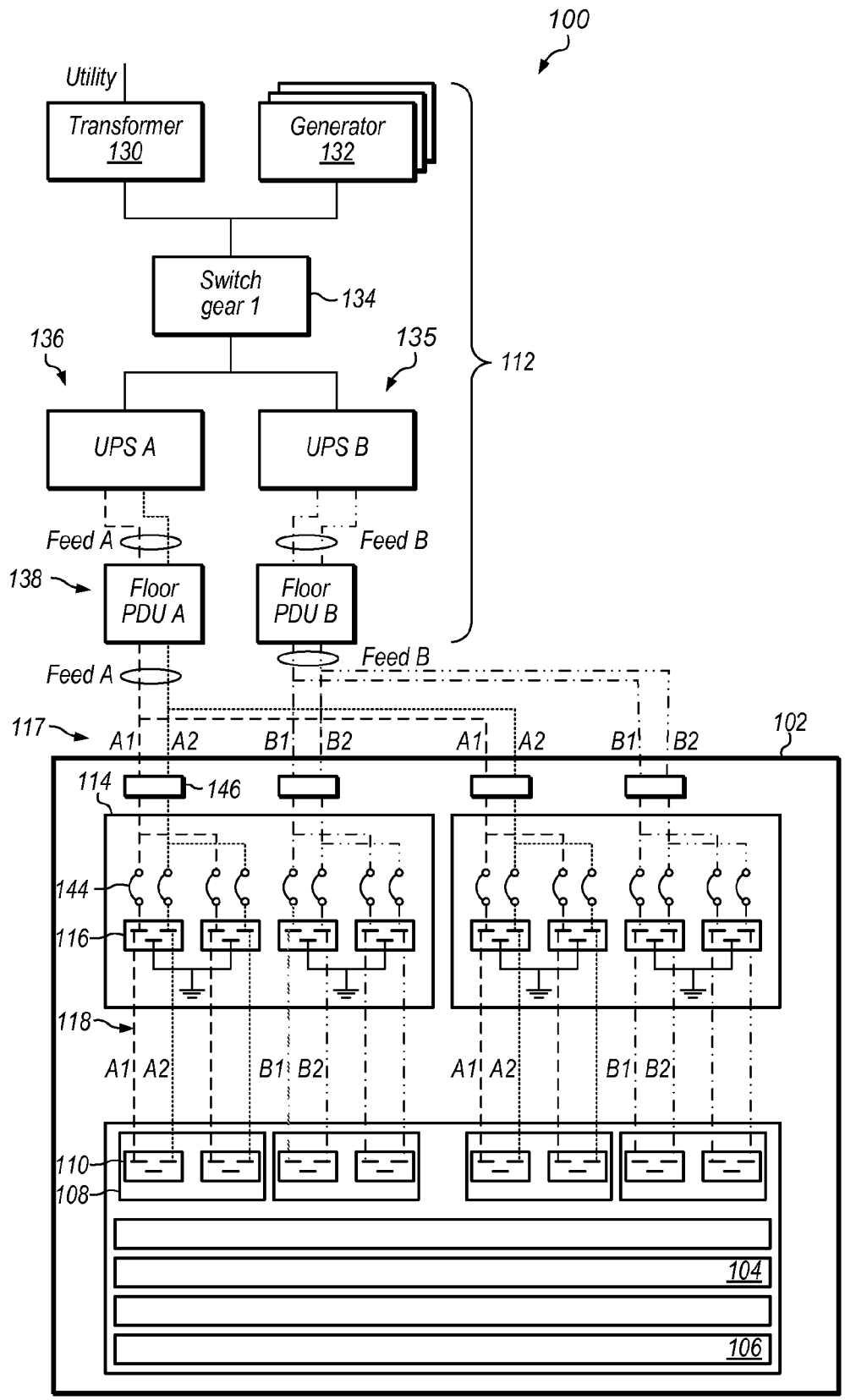
FIG. 1 is a block diagram illustrating one embodiment of a system with rack PDU output receptacles that match power inputs for a rack-mounted system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and systems for providing power to electrical systems, such as computing devices in a data center, are disclosed.

According to one embodiment, a system includes a rack, one or more computing devices, one or more rack power distribution units, and one or more cables. The computing devices may be, for example, a network switch. The computing devices include one or more power supply units with a set of power inputs. The rack power distribution units include a set of power output receptacles. Cables couple the set of power inputs of the power supply units to the set of power output receptacles on the one or more rack power distribution units. The set of power output receptacles on the rack power distribution units match the set of power inputs on the power supply units such that, when the power inputs of the one or more power supply units are coupled to the power output receptacles of the rack power distribution units, there are no unused power output receptacles on the rack power distribution units.

According to one embodiment, a system includes a rack, one or more computing devices, and one or more rack power distribution units. The computing devices include one or more power supply units. The rack power distribution units include a set of power output receptacles. A set of power inputs on the power supply units matches the set of output receptacles on the rack power distribution units.

According to one embodiment, a system includes a rack and one or more computing devices coupled to the rack. The computing devices include one or more power inputs. The rack power distribution units include a set of power output receptacles. The set of power output receptacles on the rack power distribution units correspond to the set of power inputs for the computing devices. The rack power distribution units receive two or more power feeds and distribute power from the feeds to the power inputs.

According to one embodiment, a method of providing electrical power to systems in a rack includes providing rack power distribution units having one or more output receptacles. Power inputs for a set of electrical loads in the rack are coupled to all of the output receptacles in the rack power distribution units such that, when the power inputs are coupled to the output receptacles, there are no unused output receptacles on the one or more rack power distribution units.

As used herein, "computer room" means a room of a building in which computer systems, such as rack-mounted servers, are operated.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "operating power" means power that can be used by one or more computer system components. Operating power may be stepped down in a power distribution unit or in elements downstream from the power distribution units. For example, a server power supply may step down operating power voltages (and rectify alternating current to direct current).

As used herein, a "cable" includes any cable, conduit, or line that carries one or more conductors and that is flexible over at least a portion of its length. A cable may include a connector portion, such as a plug, at one or more of its ends.

As used herein, "computing" includes any operations that can be performed by a computer, such as computation, data storage, data retrieval, or communications.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "power distribution unit" means any device, module, component, or combination thereof, that can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.). A power distribution unit may include a transformer, power monitoring, fault detection, and isolation.

As used herein, "floor power distribution unit" refers to a power distribution unit that can distribute electrical power to various components in a computer room. A power distribution unit may be housed in an enclosure, such as a cabinet.

As used herein, "rack power distribution unit" refers to a power distribution unit that can be used to distribute electrical power to various components in a rack. A rack power distribution may include various components and elements, including wiring, bus bars, connectors, and circuit breakers. In some embodiments, a rack power distribution unit may distribute power to only some of the electrical systems in a rack. In some embodiments, a single rack includes two or more rack power distribution units that distribute power to different sets of electrical systems in the rack. For example, one rack may include a left rack power distribution unit that distributes power to half of the servers in the rack, and a right rack power distribution unit that distributes power to the other half of the servers in the rack.

As used herein, a "rack" means a rack, container, frame, shelf, or other element or combination of elements that can contain or physically support one or more computing devices.

As used herein, a "module" is a component or a combination of components physically coupled to one another. A module may include functional elements and systems, such as computer systems, circuit boards, racks, blowers, ducts, and power distribution units, as well as structural elements, such as a base, frame, housing, or container.

As used herein, "PDU coupling device" means any device that couples a power distribution unit with one or more other elements. In some embodiments, a PDU coupling device includes one or more cables. In some embodiments, a PDU coupling device includes a wireless transmitter/receiver combination.

As used herein, "primary power" means any power that can be supplied to an electrical load, for example, during normal operating conditions.

As used herein, "reserve power" means power that can be supplied to an electrical load upon the failure of, or as a substitute for, primary power to the load.

As used herein, "source power" includes power from any source, including but not limited to power received from a utility feed. In certain embodiments, "source power" may be received from the output of a transformer.

In various embodiments, a system for providing computing resources includes rack power distribution units with a set of power output receptacles that match a set of power inputs for equipment in the rack. The equipment may be, for example, an integrated system such as a network switch. When the power inputs for the equipment are connected to the output receptacles on the rack power distribution unit, all of the output receptacles may be occupied. Thus, there may be no empty output receptacles for plugging in additional equipment.

FIG. 1 is a block diagram illustrating one embodiment of a system with rack PDU output receptacles that match power inputs for a rack-mounted system. System 100 includes rack 102 and computing system 104. Computing system 104 may be, for example, a switch system for a data center. Computing system 104 includes servers 106 and power supply units 108. Servers 106 perform computing operations in system 100. In one embodiment, system 100 is a data center.

Power supply units 108 supply power to servers 106. Power supply units 108 receive power from power system 112 by way of rack power distribution units 114. Rack power distribution units 114 include output receptacles 116. Rack power distribution units 114 receive power from power system 112 by way of lines 117. Power supply units 108 of computing system 104 receive power by way of lines 118. Lines 118 may be, in some embodiments, one or more cables. For example, in one embodiment, lines 118 include a set of cables, each of the cables connecting one of output power receptacles 116 on rack power distribution unit 114 to a corresponding one of power supply power input receptacles 110 on power supply units 108. In one embodiment, each pair of lines 117 coming into each rack power distribution unit 114 carries up to about 30 to 32 amps and each pair of lines 118 coming out of rack power distribution unit 118 carries up to about 15 to 16 amps.

Power system 112 includes transformer 130, generators 132, switchgear apparatus 134, and primary power systems 135. Each of primary power systems 135 includes UPS 136 and one or more floor power distribution units ("PDUs") 138.

Electrical systems in rack 104 may each receive power from one or more of primary power systems 135. In one embodiment, each of primary power systems 135 corresponds to, and provides power to, the servers in one room in data center 100. In one embodiment, each of primary power systems 135 corresponds to, and provides power to, one rack system in a data center. In FIG. 1, for the sake of clarity, computing devices are shown coupled to only two floor PDUs 138. Electrical systems may, however, be coupled to any number of PDUs 138 in system 100.

In some embodiments, one or more of floor power distribution units 138 includes a transformer that transforms the voltage from switchgear apparatus 134.

Transformer 130 is coupled to a utility feed. The utility feed may be a medium voltage feed. In certain embodiments, the utility feed is at a voltage of about 13.5 kilovolts or 12.8 kilovolts at a frequency of about 60 Hz. Generators 132 may provide power to primary power systems 135 in the event of a failure of utility power to transformer 130. In one embodiment, one of generators 132 provides back-up power for each of primary power systems 135.

UPS 136 may provide uninterrupted power to racks 104 in the event of a power failure upstream from UPS 136. In certain embodiments, a UPS receives three-phase power from a transformer. The UPS may supply three-phase power to a floor power distribution unit.

PDU power may be any suitable voltage. In one embodiment, electrical power is about 208 V. In one embodiment, electrical power is about 230 V. In some embodiments, different electrical systems in racks 104 may operate on different phases of a primary power system. Each of the legs may correspond to one phase of the input power. In one embodiment, each leg operates at a voltage between about 220 volts to about 260 volts.

Lines 117 from floor PDU 138 to rack PDU 114 may be by way of connector 146. In one embodiment, connector 146 is a panel-mount receptacle in a chassis for rack PDU 114. Connector 146 may be any suitable power connector. In one embodiment, power is provided to rack PDUs by way of an 8AWG/6 mm² 5 core cable and a 30A NEMA/32A IEC309 3Ph+N+E Plug.

In some embodiments, a data center includes a reserve power system. The reserve power system may provide reserve power for any or all of the electrical systems supplied by one or more primary power systems. In some embodiments, a reserve power system is powered up at all times during operation of a data center. The reserve power system may be passive until a failure of one or more components of the primary power system for one or more of the electrical systems in the system, at which time the reserve power system may become active.

For illustrative purposes, one switchgear apparatus 134, two UPSs 136, and two floor PDUs 138 are shown in FIG. 1. The number of power distribution units, UPSs, switchgear apparatus may, however, vary from embodiment to embodiment (and, within a given embodiment, from system to system). For example, each of UPSs 136 may supply power to any suitable number of floor power distribution units 138 and electrical systems in any number of racks 102. As another example, each of switchgear apparatus 134 may supply power to any suitable number of UPSs 136.

In some embodiments, a rack power distribution receives power from two or more power feeds. For example, in the embodiment illustrated in FIG. 1, system 100 includes Feed A and Feed B. Feed A includes lines A1 and A2. Feed B includes lines B1 and B2. Each feed may includes one or more phase lines and/or a neutral. For example, in one embodiment, line A1 and line B1 are hot lines and lines A2 and B2 are neutral lines. Each of rack PDUs 114 may receive a feed from both of Feed A and Feed B.

In some embodiments, one or more rack power distribution units and power supply units are connected to provide power supply redundancy for equipment in a rack. In some embodiments, a system has N+1 power supply redundancy. For example, in the embodiment illustrated in FIG. 1, in the event of a failure of any one of power supply units 114, integrated computing system 104 may receive sufficient power from the remaining power supply units 108 to remain in operation.

Figure 2:
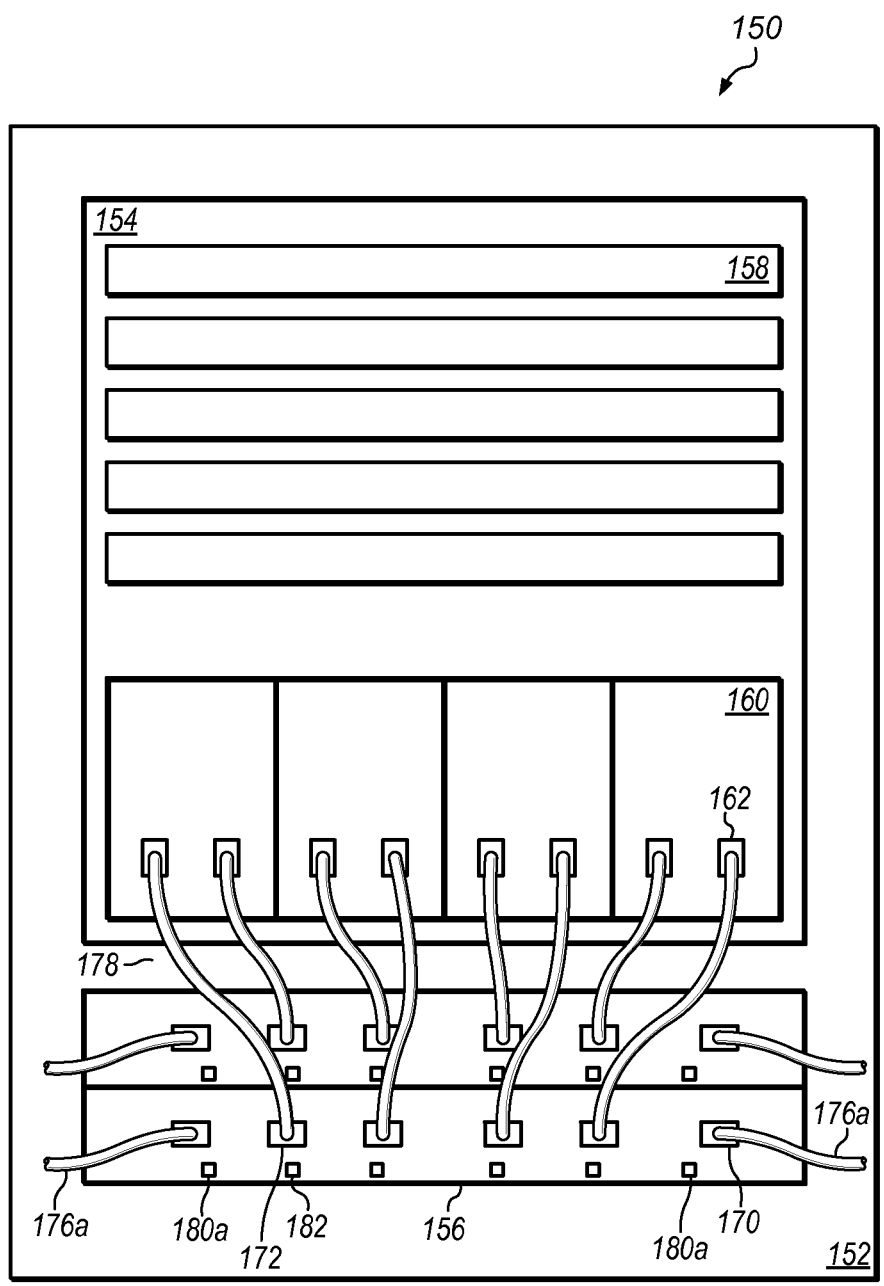
FIG. 2 illustrates one embodiment of a rack system including power supply unit input receptacles fed from a matching set of rack PDU output receptacles.

FIG. 2 illustrates one embodiment of a rack system including power supply units input receptacles fed from a matching set of rack PDU output receptacles. System 150 includes rack 152, computing system 154, and two rack power distribution units 156.

In one embodiment, computing system 154 is a network switch. Computing system 154 includes computing devices 158 and power supply units 160. Power supply units 160 supply power to computing devices 158.

In some embodiments, a rack system includes an integrated, rack-mounted computing system. Examples of rack-mounted systems that may be used with the rack power distribution units described herein include Cisco Nexus 7000 series switches, Juniper EX series Ethernet switches, and Juniper MX series systems.

Each of power supply units 160 includes two input receptacles 162. Thus, in the embodiment shown in FIG. 2, computing system 154 has a total of eight input receptacles. In one embodiment, power supply input receptacles 162 are IEC 60320 C19 panel-mount receptacles.

Each of rack power distribution units 156 includes two rack power distribution unit input receptacles 170. Input power cables 176a and 176b may be coupled to rack power distribution unit input receptacles 170. Each of the input power cables 176a and 176b may carry power for a separate power feed. For example, for the power system shown in FIG. 2, input power cable 176a may carry Feed A and input power cable 176b carry Feed B.

Rack power distribution units 156 include output receptacles 172. In one embodiment, output receptacles 172 are IEC 60320 C19 panel-mount receptacles.

In the embodiment shown in FIG. 2, each of rack power distribution units 156 includes four power output receptacles 172. Thus, in this embodiment, the total number of output receptacles 172 on rack power distribution units 156 matches the total number of power input receptacles 162 on power supply units 160 of computing system 154 (eight receptacles each). Accordingly, the receptacles of rack power distribution unit 156 and power supply units 160 can be connected in a one-for-one relationship. In particular, one of cables 178 couples each of rack PDU output receptacles 172 to a corresponding one of the power supply input receptacles 162.

In some embodiments, wiring of rack power distribution units 156 is as shown in FIG. 1. On each of rack power distribution units 156, two of output power receptacles 172 may be on Feed A and the other two of output power receptacles may be on Feed B.

Rack power distribution unit 156 includes power feed indicator light 180a and power feed indicator light 180b. Power feed indicator light 180a may provide a visual indication that power is being received from Feed A. Power feed indicator light 180b may provide a visual indication that power is being received from Feed B.

Although in the embodiment described relative to FIGS. 1 and 2 above, the rack power distribution units supply power receive two power feeds, in various embodiments, a rack power distribution unit may distribute power from three or more feeds. Although in the embodiment described relative to FIGS. 1 and 2 above, rack PDUs included a one-to-one relationship between 8 receptacles, any number of rack power distribution units may in various embodiments be matched with power inputs (for example, 4 to 4, 6 to 6, or 12 to 12). In some embodiments, one or more cables connecting rack power distribution units with power input for electrical loads may include branching (for example, a Y-cable that connects two outputs with one input, a Y-cable that connects one output with two inputs, etc.) In certain embodiments, some or all of the electrical connections may be made with conductive elements other than cables, such as bus bars.

Each of the outputs on rack power distribution unit 156 may be protected by one of breakers 182. In one embodiment, each breaker is a 20A single pole MCB. Breakers 182 may be manually operated to shut off power to a corresponding one of output receptacles 172.

Figure 3:
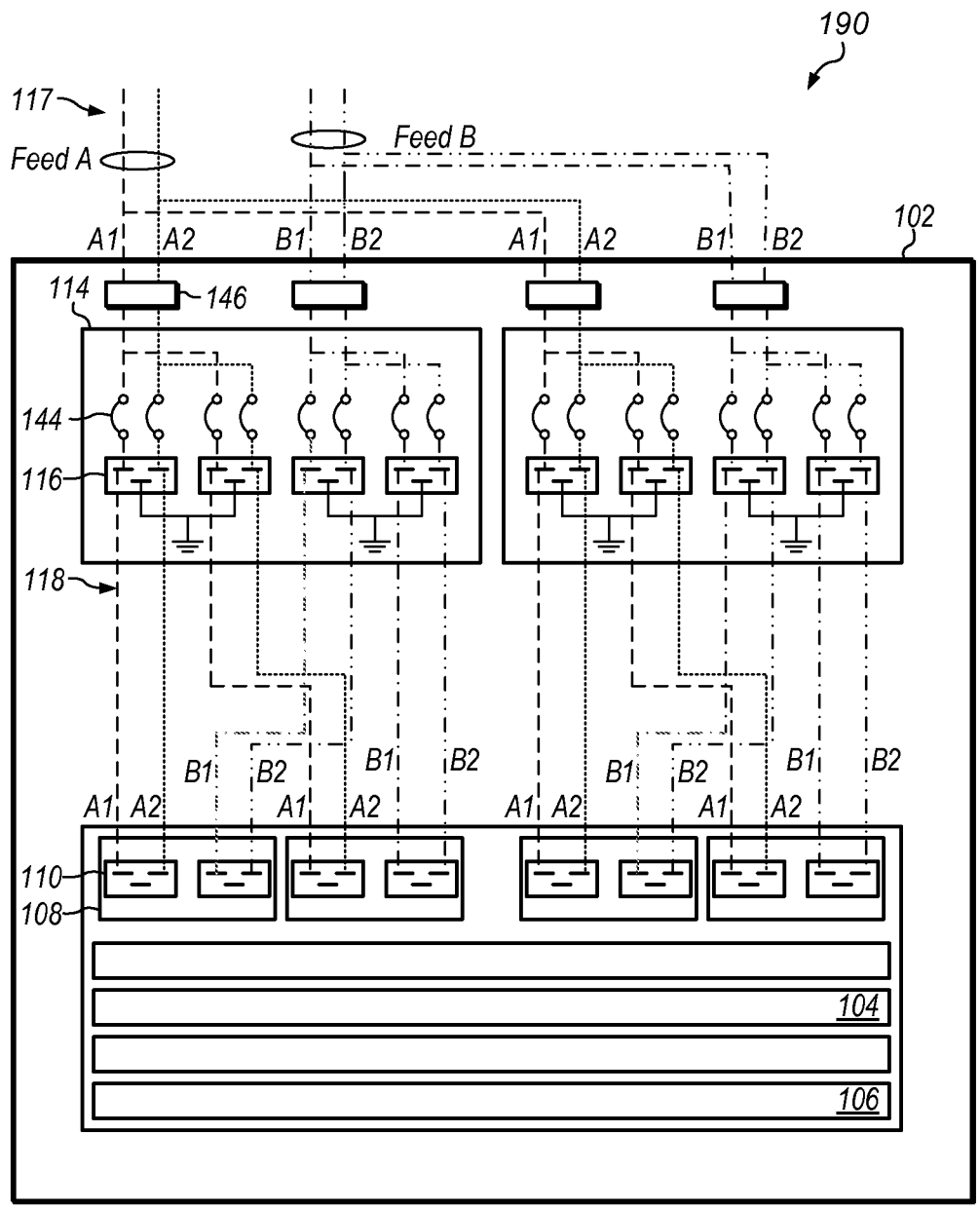
FIG. 3 illustrates one embodiment of a computing system having input source redundancy within power supply units.

In some embodiments, one or more power supply units in a rack-mounted system have input source redundancy. FIG. 3 illustrates one embodiment of a computing system having input source redundancy within power supply units. System 190 may have similar components and a similar arrangement to system 100 described above relative to FIG. 1. Each of input receptacles 110 of power supply units 108 may be connected to one of output receptacles 116 of one of rack power distribution units 114 in a one-to-one relationship. In system 190, however, power supply units 108 are connected to rack power distribution units 114 such that each of power supply units 108 receives one input from Feed A and the other input from Feed B. In the event of a failure of either Feed A or Feed B, each of power supply units 108 may continue to remain powered by the remaining feed. In some embodiments, servers 106, power supply units 108, or both, include power management circuitry to handle power from different feeds.

Figure 4:
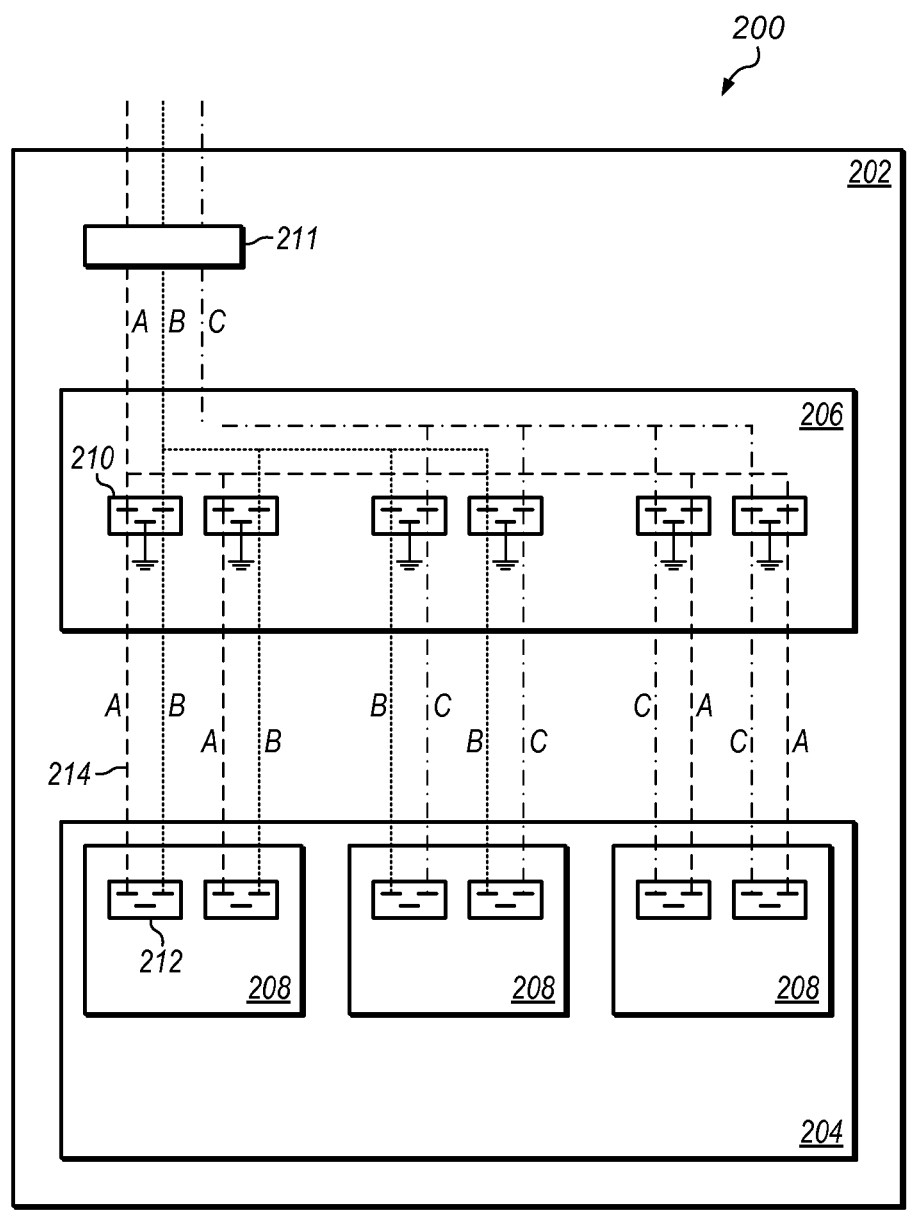
FIG. 4 illustrates one embodiment of a rack power distribution unit including outputs for distributing three-phase power to a set of matching inputs.

FIG. 4 illustrates one embodiment of a rack power distribution unit including outputs for distributing three-phase power to a set of matching inputs. System 200 includes rack 202, computing system 204, and rack power distribution unit 206. Rack 202 holds computing system 204 and rack power distribution unit 206. Computing system 204 includes power supply units 208. Each of power supply units 208 includes two power supply input receptacles 212.

Rack power distribution unit 206 includes output receptacles 210 and input connector 211. Input connector 211 may be coupled with a three-phase source power feed. The source power feed may include phase lines A, B, and C. Two of output receptacles 210 carry power for each of the phase combination (A-B, B-C, and C-A) of the power feed.

Each of power supply input receptacles 212 may couple with a corresponding output receptacle 210. Thus, when all of the power inputs of computing system 204, there are no empty receptacles on rack power distribution unit 206.

Figure 5:
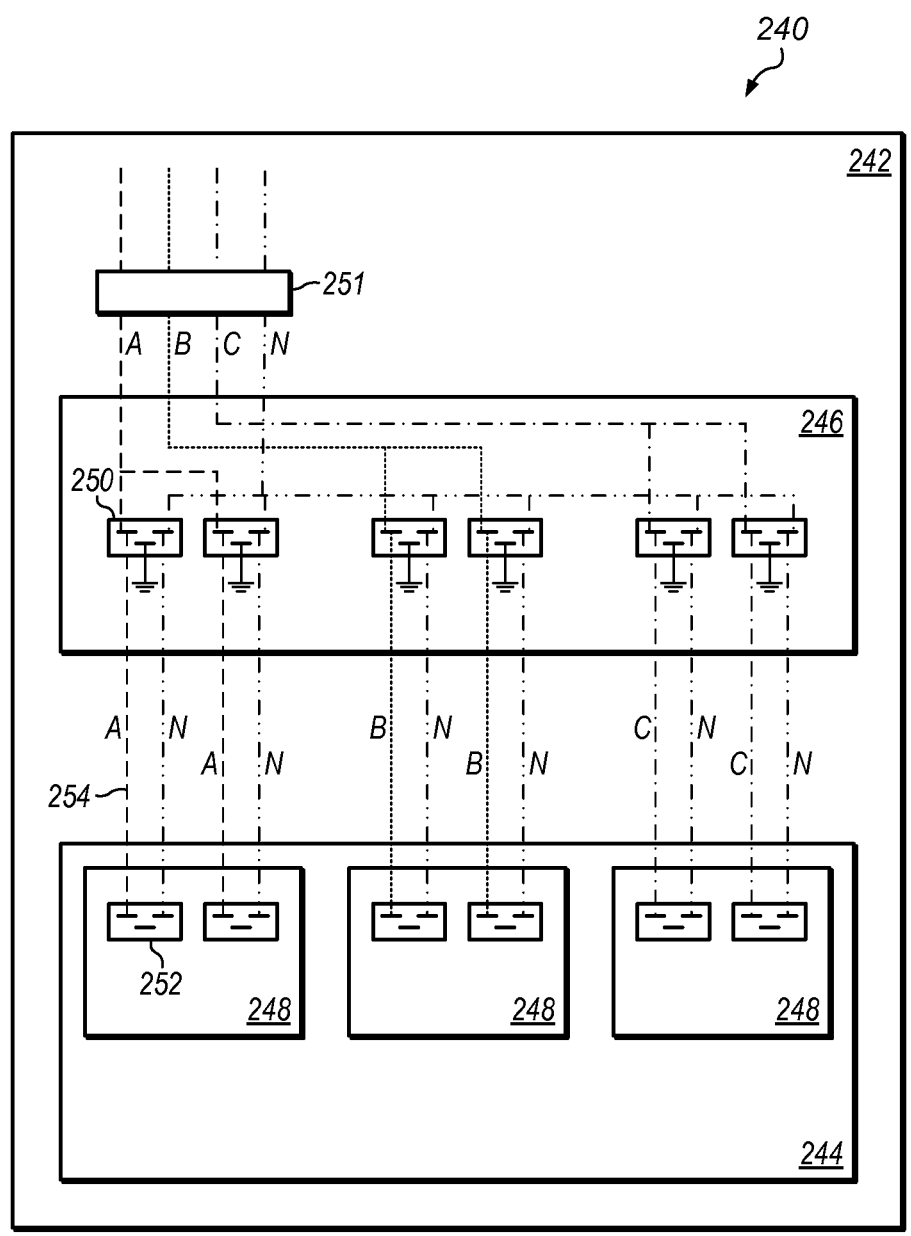
FIG. 5 illustrates one embodiment of a rack power distribution unit including outputs for distributing three-phase power with a neutral to a set of matching inputs.

FIG. 5 illustrates one embodiment of a rack power distribution unit including outputs for distributing three-phase power with a neutral to a set of matching inputs. System 240 includes rack 242, computing system 244, and rack power distribution unit 246. Rack 242 holds computing system 244 and rack power distribution unit 246. Computing system 244 includes power supply units 248. Each of power supply units 248 includes two power supply input receptacles 252.

Rack power distribution unit 246 includes output receptacles 250 and input connector 251. Input connector 251 may be coupled with a three-phase source power feed. The source power feed may include phase lines A, B, and C, and neutral N. Two of output receptacles 250 carry power for each of the combination of hot and neutral (A-B, B-N, and C-N) of the power feed.

Each of power supply input receptacles 252 may couple with a corresponding output receptacle 250. Thus, when all of the power inputs of computing system 244, there are no empty receptacles on rack power distribution unit 246.

Figure 6:
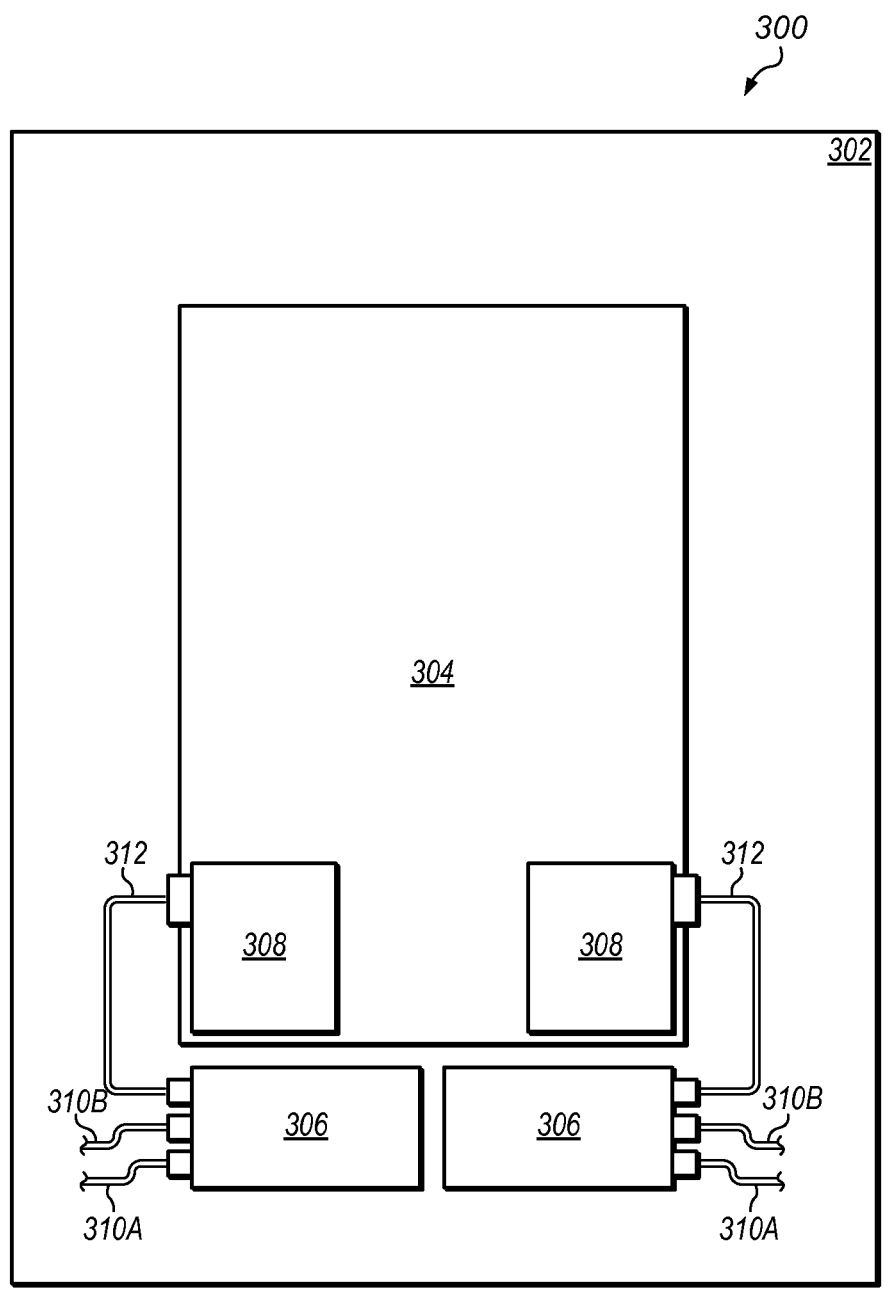
FIG. 6 is a side view illustrating one embodiment of a system including rack power distribution units on opposing faces of a rack.

In some embodiments, two or more rack power distribution units are positioned to provide power to different parts of a rack. FIG. 6 is a side view illustrating one embodiment of a system including rack power distribution units on opposing faces of a rack. System 300 includes rack 302, computing system 304, and rack power distribution units 306. Rack power distribution units 306 may be, for example, as described above relative to FIGS. 1 and 2. Computing system 304 includes power supply units 308 on the front and rear faces of computing system 304. Rack power distribution units 306 may receive input power feeds by way of cables 310A and 310B. Each of input cables 310A and 310B may carry a separate power feed.

Each of rack power distribution units 306 may distribute power from two or more feeds to power supply units 308. Rack power distribution unit 306 at the front of the rack distributes power to one or more power supply units 308 that face the front of rack 302 by way of cables 312. Rack power distribution unit 306 at the rear of rack 302 distributes power to one or more power supply units 308 that face the rear of rack 302 by way of cables 312.

Figure 7:
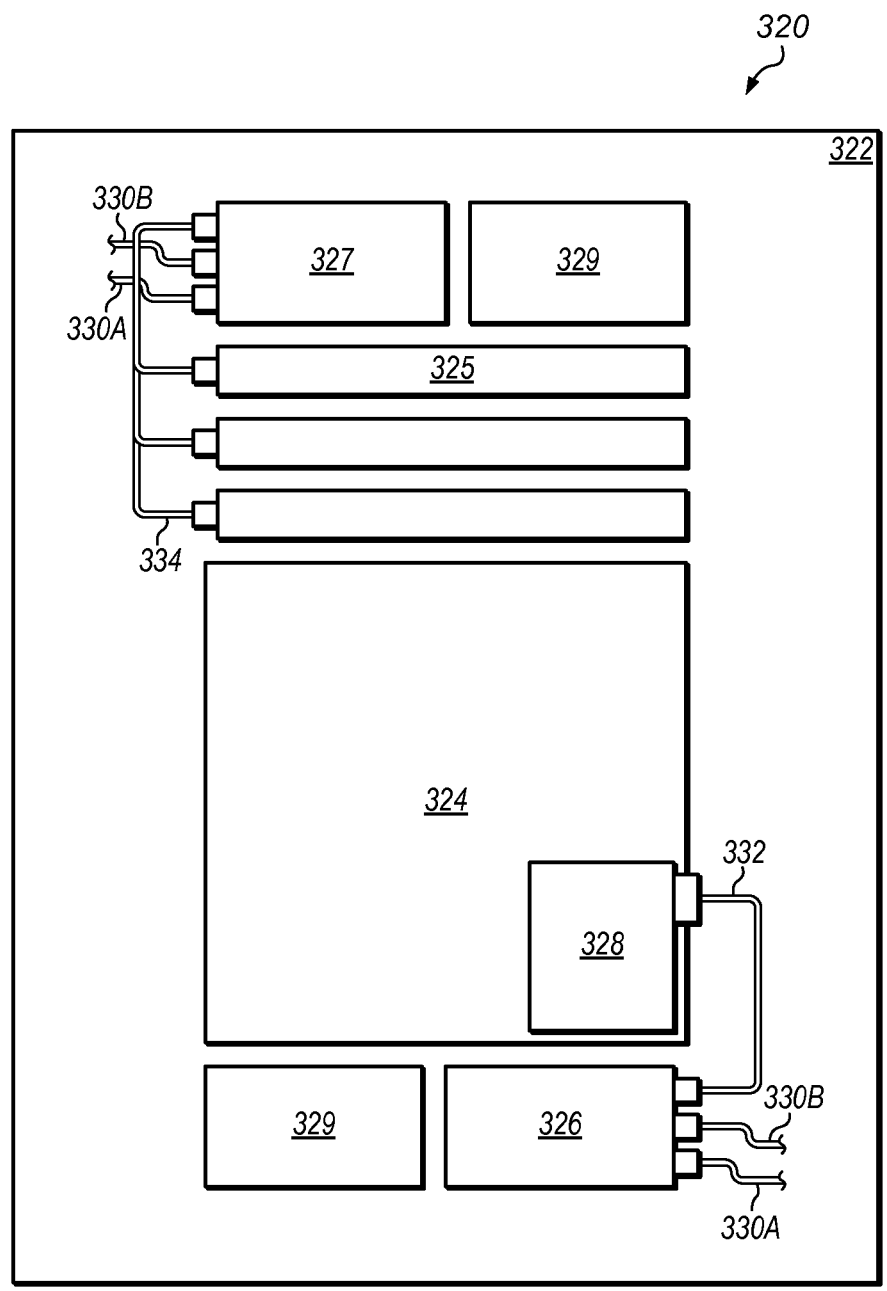
FIG. 7 is a side view illustrating one embodiment of a system including rack power distribution units on different faces and different levels of a rack.

FIG. 7 is a side view illustrating one embodiment of a system including rack power distribution units on different faces and different levels of a rack. System 320 includes rack 322, computing system 324, servers 325, and rack power distribution units 326 and 327. Rack power distribution unit 326 may face the rear of rack 322. Rack power distribution unit 327 may face the front of rack 322. Components 329 may be installed in the empty space behind rack power distribution units 326 and 327. Rack power distribution units 326 and 327 may be, for example, as described above relative to FIGS. 1 and 2.

Computing system 324 includes power supply units 328. Rack power distribution units 326 and 327 may receive input power feeds by way of cables 330A and 330B. Each of input cables 330A and 330B may carry a separate power feed.

Rack power distribution units 326 and 327 may distribute power from two or more feeds to components in rack 322. For example, rack power distribution unit 306 at the front of the rack may distribute power to servers 325 by way of cables 334. Rack power distribution unit 326 at the rear of rack 322 may distribute power to power supply units 328 by way of cables 332.

In some embodiments, rack power distribution units are selected for a particular rack-mounted computing system such that all of the output receptacles on the rack power distribution units are used when the rack-mounted computing system is fully connected to power. For example, a particular configuration of a Cisco Nexus 7000 series switch may include three 6.0 kilowatt power supply units with two C 19 power receptacles for each power supply unit. A rack power distribution unit may be selected for the rack that includes 6 power output receptacles. Each of the six power input receptacles on the power supply units may be coupled to one of the six power output receptacles on the rack power distribution unit, such that there are no empty output receptacles with the switch is fully connected to power.

Figure 8:
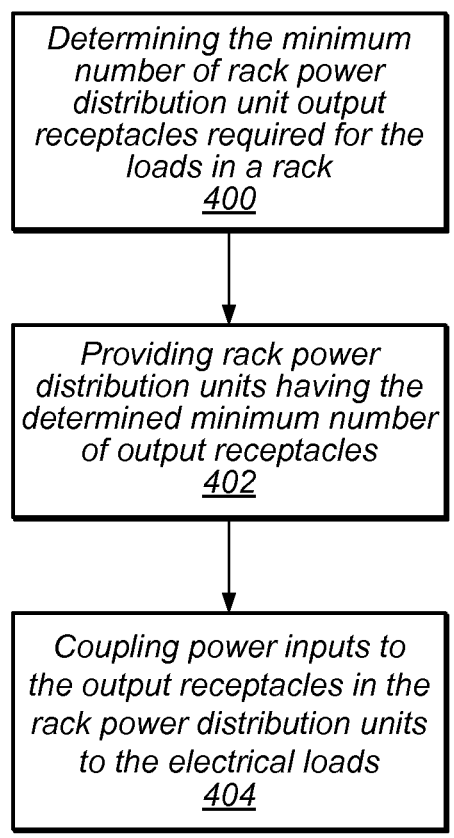
FIG. 8 illustrates one embodiment of providing power to a rack-mounted computing system.

FIG. 8 illustrates one embodiment of providing power to a rack-mounted computing system. At 400, the minimum number of rack power distribution unit output receptacles required for a set of electrical loads in the rack is determined. In some embodiments, the set of electrical loads are for an integrated system, such as a network switch.

At 402, rack power distribution units having the determined minimum number of outputs receptacles on the rack power distribution units in the rack.

At 404, power inputs for the set of electrical loads in the rack are coupled to the output receptacles in the rack power distribution units. In some embodiments, all of the output receptacles are used to provide power to the set of electrical loads such there are no empty output receptacles on the rack power distribution units when the power inputs for the set of electrical loads are coupled to the power output receptacles of the one or more rack power distribution units. In some embodiments, the input receptacles for the electrical loads (for example, the power supply unit receptacles for a switch) match the output receptacles on the rack power distribution units on a one-for-one basis.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a rack;
one or more computing devices installed in the rack, wherein the one or more computing devices comprise one or more power supply units, wherein the one or more power supply units comprise a set of power inputs;
one or more rack power distribution units installed in the rack, wherein the one or more rack power distribution units comprise a set of power output receptacles; and
one or more cables configured to couple the set of power inputs of the power supply units to the set of power output receptacles on the one or more rack power distribution units,
wherein the set of power output receptacles on the one or more rack power distribution units match the set of power inputs on the power supply units such that there are no unused power output receptacles on the one or more power distribution units when the power inputs of the one or more power supply units are coupled to the power output receptacles of the one or more rack power distribution units.

2. The system of claim 1, wherein each of the output receptacles in the set of power output receptacles has one corresponding input power receptacle in the set of power inputs of the one or more power supply units.

3. The system of claim 1, wherein the one or more power supply units supply power to an integrated system in the rack.

4. The system of claim 1, wherein at least one of the rack power distribution units receives two or more power feeds and distributes power from at least two of the power feeds to the power supply units.

5. The system of claim 1, wherein at least one of the rack power distribution units is configured to receive two or more power feeds, wherein the rack power distribution unit is configured to distribute power from at least two of the feeds to at least one of the one or more power supply units, wherein at least one of the power feeds is redundant to at least one other of the power feeds.

6. The system of claim 1, wherein at least one of the one or more computing devices comprises two or more power supply units.

7. A system, comprising:
one or more computing devices comprising one or more power supply units, wherein the one or more power supply units comprise a set of power inputs; and
one or more power distribution units, wherein the one or more power distribution units comprise a set of power output receptacles,
wherein the set of power inputs on the one or more power supply units match the set of output receptacles on the power distribution units such that there are no unused output receptacles on the one or more power distribution units when the power inputs of the one or more power supply units are coupled to the power output receptacles of the one or more power distribution units.

8. The system of claim 7, wherein the one or more power distribution units comprise two or more rack power distribution units, wherein the power output receptacles in the set of power output receptacles are distributed over at least two of the rack power distribution units.

9. The system of claim 7, wherein at least one of the power distribution units is configured to receive two or more power feeds and distribute power from at least two of the feeds to at least one of the one or more power supply units.

10. The system of claim 7, wherein the one or more distribution units are configured to supply power to the power supply units from at least one power feed, wherein at least one of the power feeds comprises single phase power.

11. The system of claim 7, wherein the one or more distribution units are configured to supply power to the power supply units from at least one power feed, wherein at least one of the power feeds comprises multiple-phase power.

12. The system of claim 7, wherein the one or more distribution units are configured to mount in one or more slots in a rack.

13. The system of claim 7, wherein at least one of the power distribution units comprises one or more overload protection devices for at least one power line.

14. The system of claim 7, wherein at least one of the one or more power distribution units comprises one or more visual indicators, wherein at least one of the visual indicators is configured to indicate power being supplied from a power feed through the at least one power distribution unit.

15. The system of claim 7, wherein at least one of the computing devices is a switch system.

16. The system of claim 7, further comprising:
a rack, wherein the one or more power distribution units comprise two or more rack power distribution units, wherein at least one of the rack power distribution units is mounted at the front of the rack and at least one other of the rack power distribution units is mounted at the back of the rack.

17. A system, comprising:

a rack;

one or more computing devices coupled to the rack, the one or more computing devices comprising one or more power inputs; and one or more rack power distribution units coupled to the rack, wherein the one or more rack power distribution units comprise a set of power output receptacles, wherein the set of power output receptacles on the one or more rack power distribution units correspond to the set of power inputs on the one or more computing devices, such that there are no unused output receptacles on the one or more rack power distribution units when the power inputs of the one or more computing devices are coupled to the power output receptacles of the one or more rack power distribution units.

18. The system of claim 17, wherein the computing devices comprise one or more power supply units, wherein the set of power inputs comprise inputs for the power supply units.

19. The system of claim 17, wherein at least one of the rack power distribution units is configured to receive two or more power feeds and distribute power from at least two of the feeds to one or more power supply units.

20. The system of claim 17, wherein at least one of the rack power distribution units is configured to receive two or more power feeds and distribute power from at least two of the feeds to one power supply unit.

21. The system of claim 17, wherein one of the feeds for one of the rack power distribution units supplies power to two or more power supply units for one of the computing devices.

22. The system of claim 17, wherein the power for at least one of the power feeds is on a different uninterruptible power supply than at least one other of the power feeds.

23. The system of claim 17, wherein the power for at least one of the power feeds is on a different phase than at least one other of the power feeds.

24. A method of providing electrical power to systems in a rack, comprising:

providing, in the rack, one or more rack power distribution units having one or more output receptacles; and coupling power inputs for a set of electrical loads in the rack to all of the output receptacles in the one or more rack power distribution units such that there are no unused output receptacles on the one or more rack power distribution units when the power inputs are coupled to the output receptacles.

25. The method of claim 24, wherein providing the one or more rack power distribution units comprises providing a rack power distribution unit with one output receptacle corresponding to each power input, wherein coupling power inputs for the electrical loads in the rack to the output receptacles in the one or more rack power distribution units to one or more power supply units for one or more electrical systems comprises coupling one power input receptacle to each of the power output receptacles.

26. The method of claim 24, wherein providing the one or more rack power distribution units comprises:

determining the minimum number of rack power distribution unit output receptacles required for the set of electrical loads in the rack, and providing the determined minimum number of outputs receptacles on the rack power distribution units in the rack, such that there are no empty output receptacles on the rack power distribution units when the power inputs for the set of electrical loads are coupled to the power output receptacles of the one or more rack power distribution units.

27. The method of claim 24, wherein the set of electrical loads comprises the power supply units for an integrated network switch system.

* * * * *